July 2, 1929.  O. F. N. ROSENGREN  1,719,381
EGG CASE
Filed June 2, 1927   2 Sheets-Sheet 1
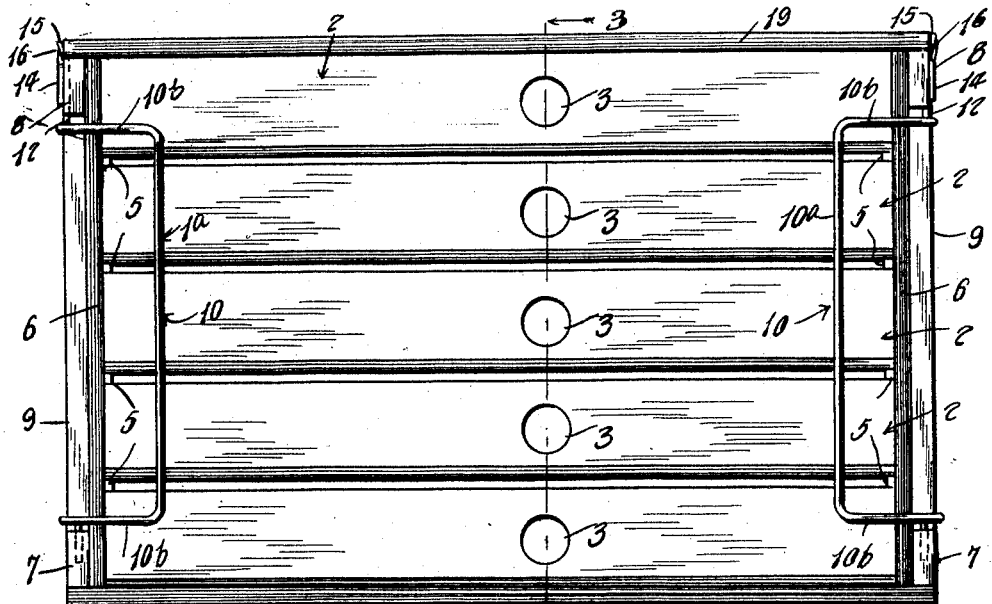
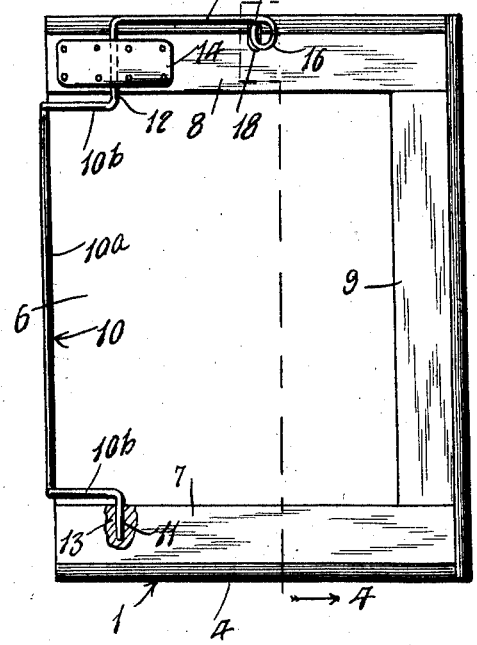
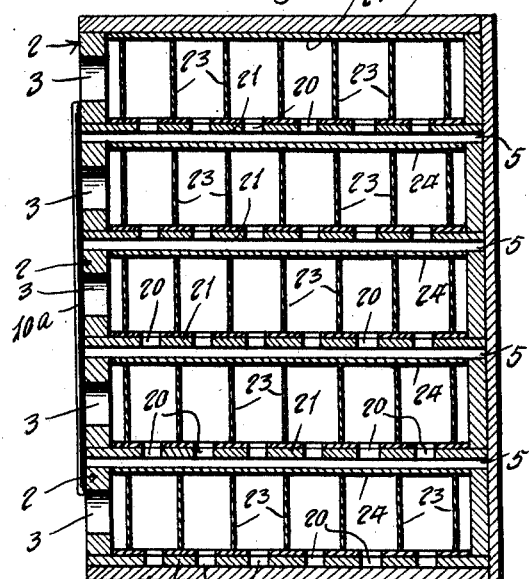
Inventor
O. F. N. Rosengren
By
Attorney July 2, 1929.  O. F. N. ROSENGREN  1,719,381
EGG CASE
Filed June 2, 1927   2 Sheets-Sheet 2
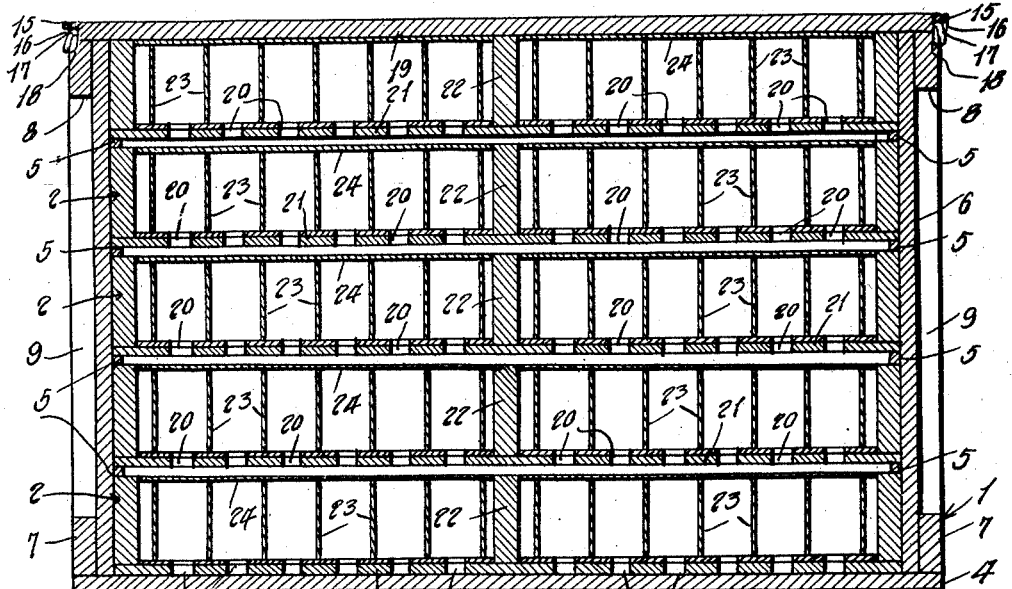
Fig. 4.  Fig. 5.  Fig. 6.
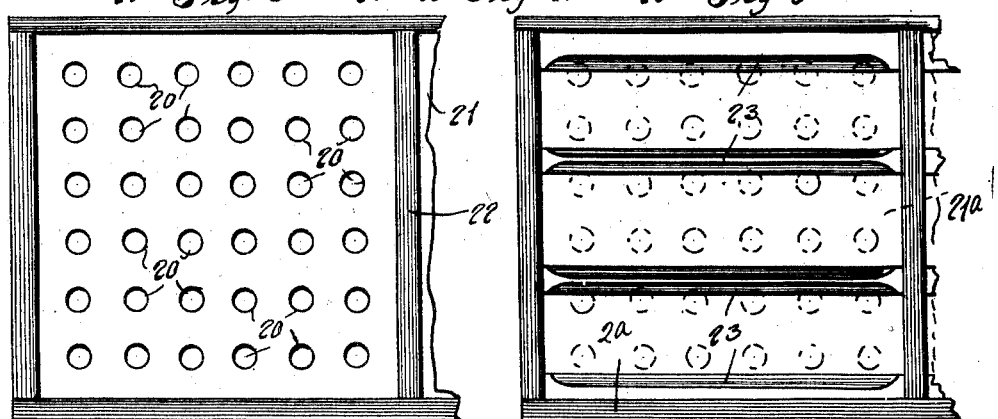
Fig. 7.
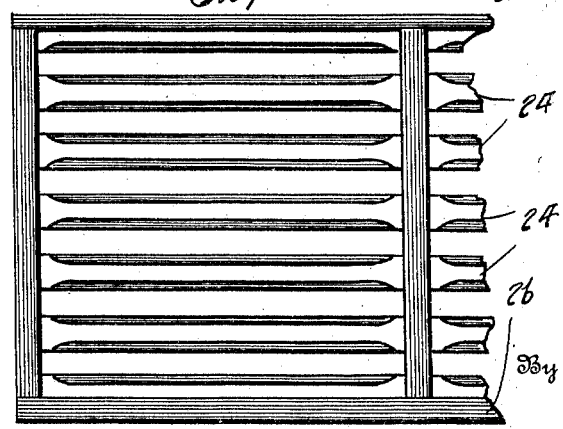
Inventor
O. F. N. Rosengren,
By
Attorney Patented July 2, 1929.

1,719,381

UNITED STATES PATENT OFFICE.

OSCAR F. N. ROSENGREN, OF NEVIS, MINNESOTA.

EGG CASE.

Application filed June 2, 1927. Serial No. 196,011.

This invention relates to and has for one of its objects to provide an egg case which will permit the eggs to be inspected for breakage and shortage and to be candled in a comparatively short time and in a comparatively simple manner, and to attain this end comprehends the placing of the eggs in trays having openings in the bottoms thereof and mounting the trays in a casing having an open front side.

A further object of the invention is to provide an egg case of the character stated with novel and simple means adapted to prevent the trays from being casually discharged from the casing while the case is in transit or being handled.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is a view in front elevation of an egg case constructed in accordance with my invention, Figure 2 is a view in end elevation of the egg case, Figure 3 is a transverse sectional view taken on the plane indicated by the line 3—3 of Figure 1, Figure 4 is a longitudinal sectional view taken on the plane indicated by the line 4—4 of Figure 2, Figure 5 is a detail top plan view of a fragmentary portion of one of the egg carrying trays, Figure 6 is a similar view of a slightly modified form of the egg carrying trays, and Figure 7 is a similar view of a further modified form of the egg carrying trays.

The egg case comprises a casing 1 and trays 2, the trays being preferably five in number and each being adapted to carry six dozen eggs. The casing 1 is fully open at its front side, and the trays 2 are provided with finger receiving openings 3, so as to permit the latter to be readily placed in and withdrawn from the former. The bottom tray rests upon the bottom wall 4 of the casing 1, and the remaining trays are supported by slides 5 which are secured to the end walls 6 of the casing. If desired, the slides 5 may be omitted and the trays 2 supported one upon the other within the casing 1. The end walls 6 are reenforced by bottom cleats 7, top cleats 8 and rear cleats 9 to which the other walls of the casing 1 are secured.

The trays 2 are retained within the casing 1 by keepers 10 which are preferably made of stout round stock and embody vertical members $10^a$ and horizontal members $10^b$. The horizontal members $10^b$ are of angular formation, and are provided with vertical trunnions 11 and 12 which are journaled in bearings 13 and 14 carried by the cleats 7 and 8, respectively. The formation of the horizontal members $10^b$ and the manner in which they are connected to the cleats 7 and 8, permit the keepers 10 to be swung into active position across the open front side of the casing 1 and into inactive position rearwardly beyond said side of the casing. The keepers 10 will when in active position contact with the front sides of the trays 2, and will when in inactive position extend clear of the trays. The keepers 10 are adapted to be moved from one of their positions to the other and held in their active position by spring arms 15 which are carried by the trunnions 12. The arms 15 are provided with finger loops 16 and with catches 17 which form continuations of the finger loops and are adapted to engage notches 18 in the top wall 19 of the casing 1 in order to retain the keepers 10 in active position. The catches 17 may be readily withdrawn from the notches 18 by grasping and exerting downward pressure on the finger loops 16, and after they have been withdrawn the keepers may be readily swung into inactive position.

The trays 2 are provided with openings 20 in the bottoms 21 thereof, and are separated into two compartments by partitions 22. Standard fillers 23 and covers 24 therefor, are placed in the trays 2. As the trays 2 may be readily withdrawn from the casing 1, and as the bottoms 21 of the trays are provided with openings, the eggs may be readily candled and examined for breakage and shortage in a comparatively short time and in a comparatively simple manner. The bottoms 21 of the trays 2 may be made of wood or other suitable material, and are permanently secured to the trays.

If desired the trays may be made as shown in Figure 6. This tray $2^a$ is provided with removable perforated bottoms $21^a$ which are supported by slats 23 secured to the under side of the tray. A further modification of the tray is shown in Figure 7, and the only difference between this tray $2^b$ and the others is that its bottom is formed of a plurality of spaced slats 24 which are spaced apart sufficiently to permit the eggs to be readily candled but not to permit the passage of the eggs through the same. The slats 23 and 24 have their upper longitudinal corners beveled as shown.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. An egg case comprising a casing fully open at its front side, trays removably supported within the casing, angular keepers pivoted to the ends of the casing, the free portions of said keepers being adapted to move into and out of position across the open front side thereof to secure the trays therein, and spring arms carried by the keepers and adapted to engage the casing to secure the keepers in said position.

2. An egg case comprising a casing having its front side fully open, trays removably supported within the casing, and keepers each consisting of a vertical member and angular horizontal members, trunnions carried by the horizontal members and journaled on the ends of the casing, and arms carried by certain of the trunnions and provided with catches adapted to engage the casing to prevent the casual movement of the keepers out of active position.

In testimony whereof I affix my signature.

OSCAR F. N. ROSENGREN.